(12) United States Patent
Jouneau et al.

(10) Patent No.: US 9,004,458 B2
(45) Date of Patent: Apr. 14, 2015

(54) VALVE FOR DISPENSING WATER AND AIR IN INSTALLATIONS THAT SPRAY WATER UNDER PRESSURE

(75) Inventors: Pierrick Jouneau, Treillieres (FR); Eric David, Treillieres (FR); Michel Galvin, Carquefou (FR)

(73) Assignee: Johnson Controls Neige, Sainte-Luce sur Loire (FR)

( * ) Notice: Subject to any disclaimer, the term of this patent is extended or adjusted under 35 U.S.C. 154(b) by 532 days.

(21) Appl. No.: 13/496,703

(22) PCT Filed: Sep. 16, 2010

(86) PCT No.: PCT/FR2010/051928
§ 371 (c)(1),
(2), (4) Date: Mar. 16, 2012

(87) PCT Pub. No.: WO2011/033226
PCT Pub. Date: Mar. 24, 2011

(65) Prior Publication Data
US 2012/0175428 A1 Jul. 12, 2012

(30) Foreign Application Priority Data
Sep. 17, 2009 (FR) ...................... 09 04446

(51) Int. Cl.
*B01F 3/04* (2006.01)
*F16K 11/07* (2006.01)
*F16K 31/04* (2006.01)
*F25C 3/04* (2006.01)

(52) U.S. Cl.
CPC ................. *F16K 11/07* (2013.01); *F16K 31/04* (2013.01); *F25C 3/04* (2013.01)

(58) Field of Classification Search
USPC .................... 261/38, 43, 44.1, 50.1, 50.3, 51; 137/625.69; 239/2.2, 14.2
See application file for complete search history.

(56) References Cited

U.S. PATENT DOCUMENTS 2,320,012 A * 5/1943 Riall ................................ 261/49
2,329,748 A * 9/1943 Edelen ............................ 261/51

(Continued)

FOREIGN PATENT DOCUMENTS

FR 2573854 5/1986
FR 2795494 12/2000

(Continued)

OTHER PUBLICATIONS

International Search Report dated Jan. 20, 2011, in corresponding PCT application.

*Primary Examiner* — Charles Bushey
(74) *Attorney, Agent, or Firm* — Young & Thompson

(57) ABSTRACT

A valve for dispensing water and air in installations for spraying water under pressure, includes: firstly, a body (2) equipped with two independent circuits (C1, C2), each for circulating a fluid, one air, the other water, each of the circuits including (i) a chamber (5, 15) accommodating a shutter member (6, 16) in the form of a spool, (ii) a duct (7, 17) for admitting the fluid, (iii) a discharge duct (8, 18) for discharging the fluid, and (iv) a drain duct (9, 19) for draining the fluid contained in the discharge duct; and, secondly, control elements for controlling the shutter members so as to make each one move between an open position which allows the fluid to pass and in which the drain duct is shut off, and a closed position in which the fluid is prevented from passing and the drain duct is open.

20 Claims, 6 Drawing Sheets

(56) References Cited

U.S. PATENT DOCUMENTS 3,779,016 A * 12/1973 Ryc .................................. 60/329
4,717,072 A     1/1988 Girardin
6,758,461 B1 *  7/2004 Omarsson .................... 261/50.1
6,805,150 B1   10/2004 Dion et al.

FOREIGN PATENT DOCUMENTS

| JP | 5 322063 | 12/1993 |
| WO | 02/061516 | 8/2002 |
| WO | 03/019059 | 3/2003 |

\* cited by examiner

VALVE FOR DISPENSING WATER AND AIR IN INSTALLATIONS THAT SPRAY WATER UNDER PRESSURE

BACKGROUND OF THE INVENTION

1. Field of the Invention

The present invention relates to a valve adapted to dispense water and air, and suitable for equipping installations for spraying water under pressure, in particular for making artificial snow.

2. Description of the Related Art

Current snow-making installations for making artificial snow incorporate much technological progress that has made it possible to improve their effectiveness and their efficiency by making better use of weather conditions.

This applies, in particular, to the spray devices equipping such snow-making installations, for making artificial snow, and that can operate at very different water and air flow-rates so as to take better advantage of weather conditions.

Such flow-rate regulation is usually implemented by means of valves adapted to dispense water and air, and that equip the feed circuits connected to such spray devices.

A valve of that type that is currently used in snow-making installations is described, for example, in Document FR-2 573 854.

That valve consists of a device in the form of a slide valve connected to the water and air feed pipes of the installation. A single cylindrical slide is driven to slide inside a chamber provided in the valve body, in order to control the water, air, and emptying flow-rates.

Although it is particularly advantageous and effective, that valve suffers from the drawback of having only a single emptying point provided in its water circuit downstream from the closure point. In very cold weather, any water present in the air circuit can then cause the spray device situated downstream to freeze. Another drawback is that water might leak into the air in the event of failure of the seals because the bore is common to both circuits.

Valves are also known that are of a universal type, adapted to dispense water, or possibly air, in installations for spraying water under pressure.

Such valves, e.g. as described in Document FR-2 795 494, are, in practice, effective and flexible in use, but they are relatively voluminous when they are combined, and they make it necessary for the water and air circuits to be managed independently, which is relatively complex.

In addition, that increases the number of control members and associated components, in particular hydraulic and electrical connectors, with ensuing economic consequences.

In addition, with the increase in the size of snow-making networks, new problems are arising:

the air network can, in certain places, trap large quantities of water; that water can constitute a major risk of the snow-makers freezing; and the water network can also contain air that might disturb the regulation of the valves.

Neither of the above-mentioned systems makes it possible in satisfactory manner to solve the problems relating both to bleeding the circuits, i.e. to purging the upstream circuits on opening the valve, and also to emptying, i.e. to removing the fluid contained in the downstream circuit on closing the valve.

SUMMARY OF THE INVENTION

An object of the present invention is thus to propose a valve for dispensing water and air, which valve is of compact and inexpensive structure while also enabling the downstream fluid flow-rates to be controlled effectively. Another object of this valve is to allow the two circuits to be emptied and also preferably to allow them (in particular the air circuit) to be bled.

To this end, the valve of the invention is characterized in that it comprises:

firstly, a body provided with two independent circuits, each of which enables a respective fluid to flow through it, one air and the other water, each of which circuits includes: (i) a chamber in which a closure member in the form of a slide is received; (ii) a fluid inlet channel that enables the fluid to enter said body via an upstream orifice, and that is connected to said chamber via a downstream orifice; (iii) a fluid outlet channel that enables the fluid to exit, that is connected to said chamber via an upstream orifice, and that opens out from said body via a downstream orifice; and (iv) a channel in communication with said outlet channel or suitable for coming into communication therewith, provided with an upstream orifice and opening out (advantageously at the bottom end of the associated chamber) via a downstream orifice, in particular in order to enable the fluid contained in said outlet channel to be emptied;

and secondly, means for controlling said closure members as disposed and guided in their respective chambers, so as to cause each of them to go between:

an open position, in which said inlet channel is in communication with said outlet channel via a through zone of said chamber, and in which said emptying channel is closed off; and a closed position, in which said through zone (and advantageously the downstream orifice of the inlet channel and/or the upstream orifice of the outlet channel) is closed off by said associated closure member, and in which the emptying channel is open;

and in that said control means comprise—a single motor-drive unit for driving said closure members; and—a structure for mechanically coupling together the two closure members so as to ensure that said two closure members are driven simultaneously within their respective chambers.

In a particular embodiment, the motor-drive unit co-operates with one of the closure members, and the coupling structure mechanically interconnects the top ends of the two closure members so as to ensure that they are driven simultaneously.

According to another characteristic, the valve is structured so that the closure members are suitable for being driven into a configuration in which the closure member of the air circuit is situated in its open position while the closure member of the water circuit is in its closed position.

It is also structured so that driving the closure members into the open position makes it possible to regulate the flow rate and to control the pressure of at least one of the fluids.

According to another feature, the valve of the invention comprises a channel in its air circuit and/or a channel in its water circuit, which channel is suitable for co-operating with the closure member of the corresponding circuit to bleed water from the air or to bleed air from the water, as applicable, from the upstream pipes, before opening said air and/or water circuits.

Also according to another characteristic, the emptying channel for the air circuit is provided in the valve body, outside the volume of the associated chamber so that its upstream orifice opens out into the outlet channel of said air circuit, and so that its downstream orifice opens out at the bottom end of said chamber; and the closure member of said air circuit is drivable by the control means into an intermediate position, situated between the closed position and the open position, in which intermediate position firstly said inlet channel is in communication with the outlet channel via the through zone of the associated chamber and secondly the emptying channel is open, so as to make it possible, in particular, for the air circuit to be subjected to an active bleed operation on opening said air circuit.

According to another characteristic, the outlet channel of the air circuit comprises a baffle-forming portion, including a chamber in two portions, namely an upstream portion and a downstream portion, separated by a transverse partition provided with a through orifice offset upwards relative to the inlet orifice of said upstream portion, which downstream portion of the chamber is extended at the top via the downstream orifice of the air circuit and, at the bottom, is provided with the upstream orifice of the bleed/emptying channel.

This baffle-forming outlet channel of the air circuit offers the advantage of making it possible to separate out the condensates contained in the air.

In addition, the emptying channel of the water circuit is advantageously provided in the closure member of said water circuit, at its bottom end, which emptying channel comprises a downstream orifice opening out facing the bottom end of the associated chamber, and an upstream orifice opening out into the fluid through zone of said chamber, which emptying channel is opened or closed, depending on the position of said closure member, by means of a plug provided at the bottom end of said chamber.

Preferably, for the water circuit, the downstream orifice of the inlet channel is situated below the upstream orifice of the outlet channel; and for the air circuit, the downstream orifice of the inlet channel is situated above the upstream orifice of the outlet channel.

The present invention also provides a method of operating at least one valve for dispensing water and air, in installations for spraying water under pressure, e.g. with a view to making artificial snow, which valve or each of which valves comprises:

firstly, a body provided with said independent circuits, each of which enables a respective fluid to flow through it, one air and the other water, each of which circuits includes (i) a chamber in which a closure member in the form of a slide is received, (ii) a fluid inlet channel that enables the fluid to enter said body via an upstream orifice, and that is connected to said chamber via a downstream orifice, (iii) a fluid outlet channel that enables the fluid to exit, that is connected to said chamber via an upstream orifice, and that opens out from said body via a downstream orifice, and (iv) an emptying channel in communication with said outlet channel or suitable for coming into communication therewith, provided with an upstream orifice and opening out via a downstream orifice, in order to enable the fluid contained in said outlet channel to be emptied;

and secondly, means for controlling said closure members as disposed and guided in their respective chambers, so as to cause each of them to go between:

an open position, in which said inlet channel is in communication with said outlet channel via a through zone of said chamber, and in which said emptying channel is closed off; and a closed position, in which said through zone is closed off by said associated closure member, and in which the emptying channel is open;

said closure members of the air circuit and/or of the water circuit also being drivable into an intermediate position, situated between the closed position and the open position, in which intermediate position firstly said inlet channel is in communication with the outlet channel via said through zone of the associated chamber and secondly the emptying channel is open;

which method consists in implementing the following steps in succession, starting from a closed position for the two fluid circuits:

a) moving at least one of said closure members into the intermediate position so as to bleed the corresponding circuit;

b) moving the closure member of the air circuit only into the open position so as feed said circuit with air; and then c) moving the closure member of the water circuit into the open position so as feed said circuit with water;

which steps are implemented in reverse order for returning said two closure members to the closed position when water and air cease to be supplied.

In a particular implementation, the closure members of the air circuit and of the water circuit are drivable into an intermediate position so as to bleed the two circuits; and said intermediate position of the closure member of the water circuit is then advantageously reached before the intermediate position of the closure member of the air circuit.

When the valve is structured so that the position of the closure members makes it possible to regulate the fluid flow rate and to control the fluid pressure, the position of the closure members in the open configuration, and the time for which said position is maintained, are advantageously dependent on the measured value of the fluid pressure and/or of the fluid flow rate, or on information delivered by a water presence sensor in the outlet channel.

BRIEF DESCRIPTION OF THE DRAWING FIGURES

The invention is further illustrated, without being limited in any way, by the following description of a particular embodiment given with reference to the accompanying drawings, in which.

DETAILED DESCRIPTION OF THE INVENTION

The valve 1 of the invention, as shown in general in FIGS. 1 to 5, is particularly suitable for equipping installations for spraying water under pressure, in particular snow-making installations (snow makers) with a view to making artificial snow.

In such snow-making installations, valves 1 are advantageously installed in shelters that are distributed along a ski run to be covered with snow, and each valve is suitable for connecting firstly to upstream supplies of air and water under pressure in the form of pipes disposed along the ski run and coming from a machine room containing pump and compressor units, and secondly to downstream pipes associated with the spray devices (e.g. in the form of snow guns).

This valve 1 comprises a body 2, in the general shape of a compact parallelepiped block with control means 3 on top.

For example, the valve body 2 is made of aluminum; it is advantageously obtained by assembling together a plurality of molded portions.

Figure 6:
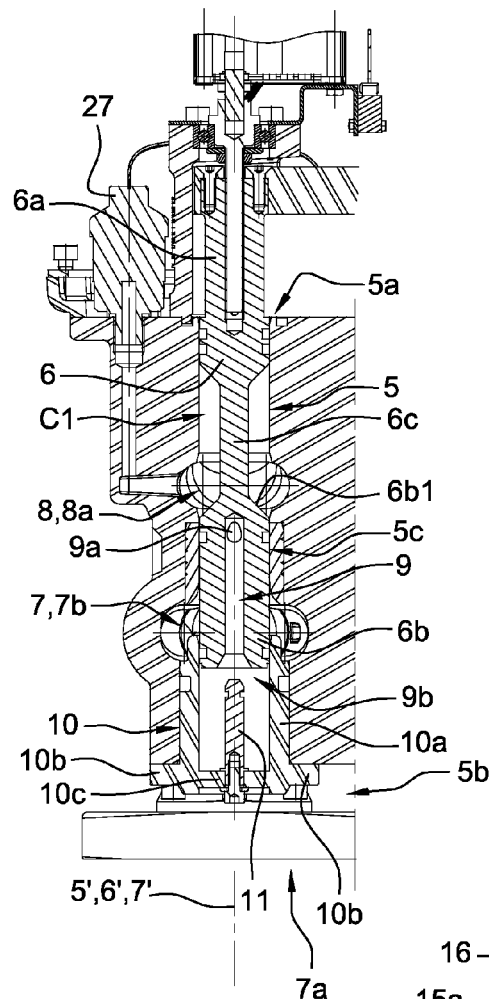
FIG. 6 is a fragmentary view on a slightly larger scale of FIG. 5, showing in detail the component elements of the water circuit.
Figure 7:
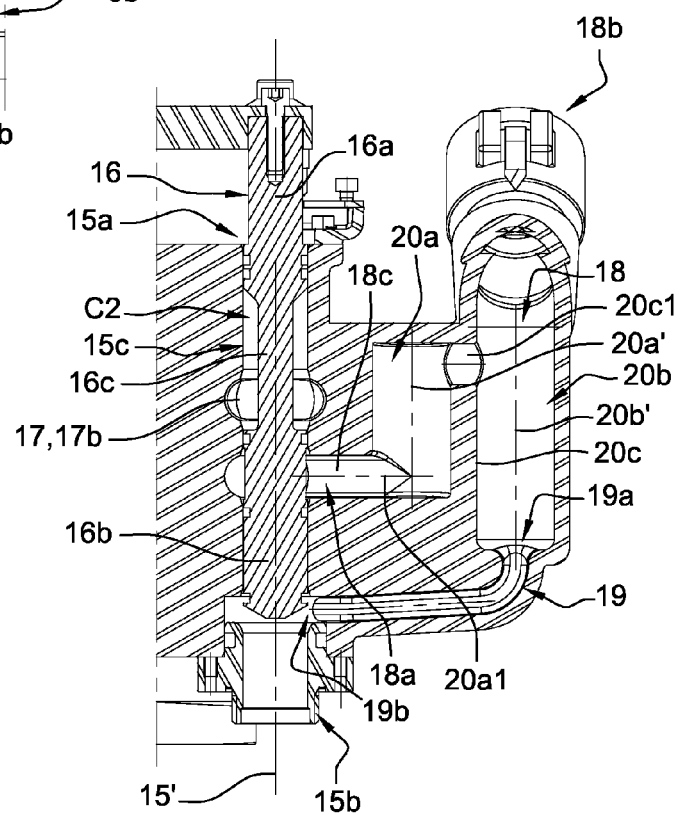
FIG. 7 is a fragmentary view in detail of FIG. 5, showing the component elements of the air circuit.

This valve body 2 is provided with two independent circuits C1, C2, each of which is suitable for enabling a respective fluid to flow through it:
  a first circuit C1, shown in detail and in isolated manner in FIG. 6, enables pressurized water to flow through it; and
  a second circuit C2, shown in detail and in isolated manner in FIG. 7, is designed to channel pressurized air.

In order to facilitate the description below, the terms "upstream" and "downstream" are used in relation to the normal flow direction of the fluids through the corresponding circuits C1 and C2.

The water circuit C1, as shown in particular in FIG. 6, includes a chamber 5 that is specific to it, and in which a moving closure member 6 described in detail below is received and guided.

The chamber 5 consists of a through orifice that is cylindrical in general shape, that is provided over the height of the valve body 2, and that is centered on an axis 5'. It has two axial ends 5a and 5b opening out respectively upwards and downwards when the valve 1 is operated.

This circuit C1 also includes three channels 7, 8, and 9 for channeling the water inside the chamber 5:
  one channel 7 for water inlet or feed, defined by an upstream orifice 7a forming an inlet into the valve body 2 and by a downstream orifice 7b (in the form of a volute in this example) opening out into the chamber 5 (FIGS. 3 and 6);
  one channel 8 for water outlet, defined by an upstream orifice 8a (in the form of a volute in this example) opening out into the chamber 5 (FIGS. 3 and 6), and a downstream orifice 8b forming an outlet from said valve body 2; and
  a channel 9 for emptying, defined by an upstream orifice 9a and by a downstream orifice 9b, described in more detail below.

The upstream end 7a of the feed channel 7 is designed to be connected, in leaktight manner, to the general supply of the installation to be equipped (not shown); the downstream orifice 8b of the outlet channel 8 is connectable to the snow-maker, in leaktight manner, advantageously via a flexible hose.

The inlet channel 7 and the outlet channel 8 open out into the chamber 5 in such a manner that the downstream orifice 7b of the inlet channel 7 is situated below the upstream orifice 8a of the outlet channel 8. This characteristic is advantageous, in particular, during emptying operations, as described below.

When it is not closed off by the closure member 6, the intermediate portion 5c of the chamber 5 that extends between the two orifices 7b and 8a constitutes the water flow zone through which water flows inside the chamber 5 (in an upward direction in this example).

In order to optimize emptying of the downstream circuit by gravity, the axis 8' of the outlet channel 8 is inclined upwards, going towards its outlet, e.g. at a slope of 45°.

The above-mentioned closure member 6 consists of an integrally formed elongate part forming a slide, and suitable for sliding longitudinally inside the chamber 5.

In particular, this closure member 6 is made up of two cylindrical portions, one of which is a top portion 6a and the other is a bottom portion 6b, the two portions being interconnected by an integrally formed central rod 6c.

The two cylindrical portions 6a and 6b have the same diameter, corresponding, ignoring clearance, to the diameter of the guide chamber 5. They are provided with O-ring seals for sealing the water circuit C1.

The rod 6c has a diameter of about one half of the diameter of the above-mentioned cylindrical portions 6a and 6b.

Each of the top and bottom cylindrical portions 6a, 6b is guided in a portion of the chamber 5, respectively in the vicinity of its top end 5a and in the vicinity of its bottom end 5b.

In this example, the bottom cylindrical portion 6b of the closure member 6 is guided facing the downstream orifice 7b of the feed channel 7, so as to form a kind of valve member and so as to regulate the flow rate of water exiting from the circuit C1 at the outlet channel 8.

This bottom cylindrical portion 6b of the closure member 6 is more precisely guided in a bushing or sleeve 10 mounted at the bottom end 5b of the chamber 5 (thus constituting its bottom end).

This sleeve 10 has a cylindrical tubular portion 10a that fits into the valve body 2, over a portion of the height of the chamber 5.

A bottom flange 10b makes it possible to fasten this sleeve 10 to the bottom portion of the valve body 2; the end-wall 10c of this sleeve 10 is also provided with orifices (not visible in the figures due to the section plane) that enable water to drain away during emptying as described in detail below.

The cylindrical bottom portion 6b of the closure member 6 has a frustoconical top end 6b1 converging going upwards.

This profile of varying section is designed to enable the flow-rate to be adjusted in co-operation with the profile 5c of the chamber 5, and to enable the pressure to be controlled between the inlet channel 7 and the outlet channel 8.

The emptying channel 9 is provided directly in the closure member 6.

In this example, the emptying channel 9 is in the form of a bore provided in the bottom cylindrical portion 6b of the closure member 6, and centered on the axis 6' of said closure member.

Its upstream orifice 9a is situated in the vicinity of the top end 6b1 of the bottom cylindrical portion 6b. It is in the form of a slanting duct that is connected to the chamber 5.

Its downstream orifice 9b faces towards the emptying sleeve 10, i.e. in the vicinity of the bottom end 5b of the chamber 5.

The end-wall 10c of the sleeve 10 is provided with a plug 11, in the form of a rod or of a finger, and that extends coaxially relative to the chamber 5, to the closure member 6, and to the emptying channel 9.

This plug 11, provided with an O-ring seal at its end (not shown in the figures), is designed to close off the emptying channel 9 when the closure member 6 is driven into the open position, as described below. Conversely, when the valve 1 is in the normal closure position, the plug 11 is separated from the channel 9, thereby enabling the water circuit C1 to be emptied automatically.

The air circuit C2, shown in isolation in FIG. 7, is similar to the water circuit C1 as described above with reference to FIGS. 5 and 6 (apart from its original bleed/emptying system).

In particular, a chamber 15 is to be found again, in which a closure member 16 is received and guided.

In this circuit too, the chamber 15 consists of a through orifice that is cylindrical in general shape, that is provided over the height of the valve body 2, and that is centered on an axis 15'.

This chamber 15 has two open axial ends 15a and 15b designed to face respectively upwards and downwards when the valve 1 is operated.

The axes 5' and 15' of the two chambers 5 and 15 of the valve body 2 extend parallel to each other.

This circuit C2 also includes three channels for channeling the air through its chamber 15:
one channel 17 for air inlet or feed, defined by an upstream orifice 17a forming an inlet into the valve body 2 and by a downstream orifice 17b (in the form of a volute in this example) opening out into the chamber 15;
one channel 18 for air outlet, defined by an upstream orifice 18a (in the form of a volute in this example) opening out into the chamber 15 (FIG. 7), and a downstream orifice 18b forming an outlet from the valve body 2 (FIGS. 2 and 7); and
a bleed/emptying channel 19, also defined by an upstream orifice 19a and by a downstream orifice 19b.

The upstream end 17a of the feed channel 17 is designed to be connected, in leaktight manner, to the general supply of the installation to be equipped (not shown); the downstream orifice 18b of the outlet channel 18 is connectable to the snowmaker, in leaktight manner, advantageously via a flexible hose.

The inlet channel 17 and the outlet channel 18 of the air circuit C2 open out into the chamber 15 in such a manner that the downstream orifice 17b of the inlet channel 17 is situated above the upstream orifice 18a of the outlet channel 18.

If it is not closed off by the closure member 16, the intermediate portion 15c of the chamber 15 that extends between the two orifices 17b and 18a constitutes the air flow zone through which air flows inside the chamber 15 (in a downward direction in this example).

The outlet channel 18 extends approximately in a plane that extends perpendicularly to the plane defined by the axis of the chamber 15 and by the axis 17' of the inlet channel 17.

In addition, the inlet and outlet orifices 17a and 18b of the air circuit C2 are situated on the same side of the valve body 2, and they are centered on axes that extend in parallel vertical planes.

The outlet channel 18 of the air circuit C2 is also specific in that it has a baffle-forming portion that is designed to separate out and to extract the condensates contained in the air.

For this purpose, the outlet channel 18 has a chamber 20 made up of two portions, namely an upstream portion 20a and a downstream portion 20b (defined relative to the normal direction of flow of air through the channel 18), separated by a transverse partition 20c.

Each of these upstream and downstream portions 20a and 20b of the chamber 20 is of cylindrical general shape, and each of them is centered on a respective one of axes 20a' and 20b' that are parallel to each other and relative to the chamber axis 15'.

This chamber 20 is also provided with a set of orifices arranged suitably for modifying the direction of flow of the air; in particular, the transverse partition 20c is, in this example, provided with a transverse orifice 20c1 that is offset upwards relative to the inlet orifice 20a1 of the upstream portion 20a. This inlet orifice 20a1 corresponds to the end of a small feed channel 18c that comes from the upstream orifice 18a, the axis of this channel 18c extending perpendicularly to the axis 15' of the chamber 15.

In advantageous manner, these orifices 20a1 and 20c1 of the chamber 20 are centered on axes that are parallel to each other, and that are offset in height. In addition, these orifices 20a1 and 20c1 extend perpendicularly relative to the facing walls, which are respectively an upstream wall of the partition 20c and a downstream wall of the downstream chamber 20b, this configuration making it possible to stop any micro-drops of water entrained by the air.

In addition, the downstream portion 20b of the chamber 20 comprises—a top orifice centered on the axis 20b' of said downstream portion and that leads to the downstream orifice 18b of the outlet channel 18, and—a bottom orifice, also centered on said axis 20b' and that corresponds to the upstream orifice 19a of the bleed/emptying channel 19.

Unlike the water circuit C1 described above, the bleed/emptying channel 19 for the air circuit C2 is provided directly in the valve body 2, outside the volume of the associated cylindrical chamber 15.

In this example, this bleed/emptying channel 19 is provided such that:
its upstream orifice 19a opens out into the outlet channel 18 of the air circuit C2, as described above; and
its downstream orifice 19b opens out at the level of the bottom end 15b of the chamber 15.

The closure member 16 of this air circuit C2 is similar to the closure member 6 described above for the water circuit C1. It is in the form of a moving slide having two cylindrical portions 16a and 16b interconnected by an integrally formed rod 16c.

The two cylindrical portions 16a and 16b have the same diameter, corresponding, ignoring clearance, to the diameter of the chamber 15. They are also provided with O-ring seals for sealing the air circuit C2.

Each of these top and bottom cylindrical portions 16a 16b is guided in a portion of the chamber 15, respectively in the vicinity of its top end 15a and in the vicinity of its bottom end 15b.

The rod 16c has a diameter corresponding to about one half of the diameter of the above-mentioned cylindrical portions 16a and 16b.

The cylindrical bottom portion 16b of the closure member 16 constitutes a valve member designed to move at:
the upstream orifice 18a of the outlet channel 18 so as to enable the flow rate to be adjusted and the pressure to be controlled, at the outlet of the circuit C2; and
the downstream orifice 19b of the bleed/emptying channel 19, so as to obtain the open position and the closed position thereof.

The profile of the top end of the bottom portion 16b of the closure member 16 may be of varying section so as to optimize the above-mentioned flow-rate adjustment and the above-mentioned pressure control.

In addition, the control means 3 of the valve 1 are structured so as to enable the two closure members 6 and 16 to be driven simultaneously or synchronously in their respective chambers 5 and 15.

Figure 1:
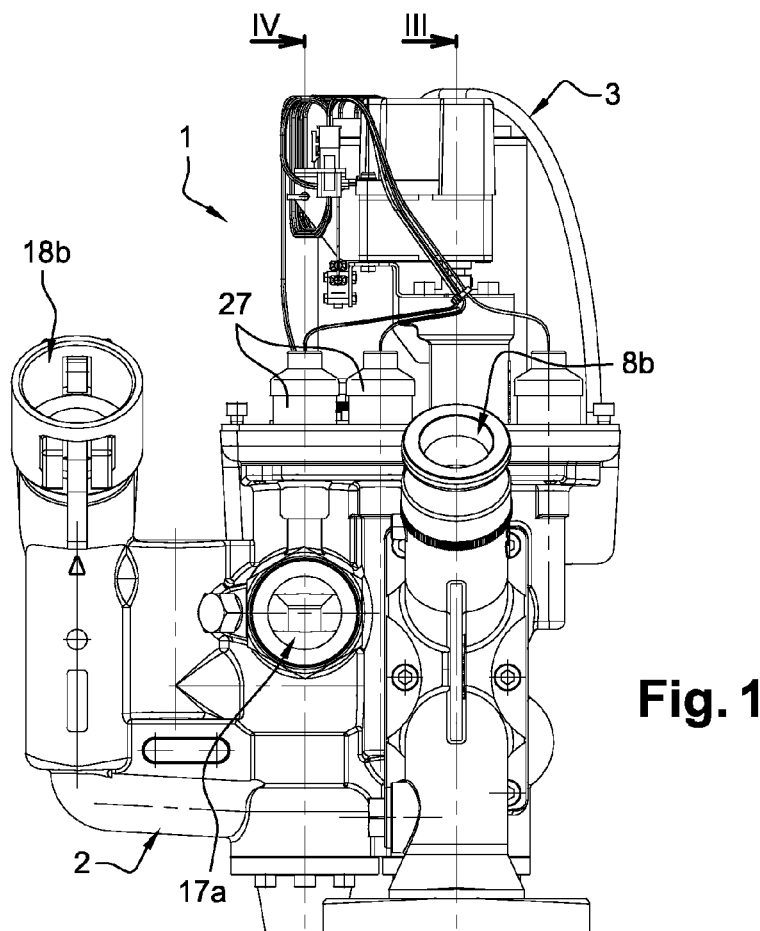
FIG. 1 is an elevation view of a valve of the invention.
Figure 2:
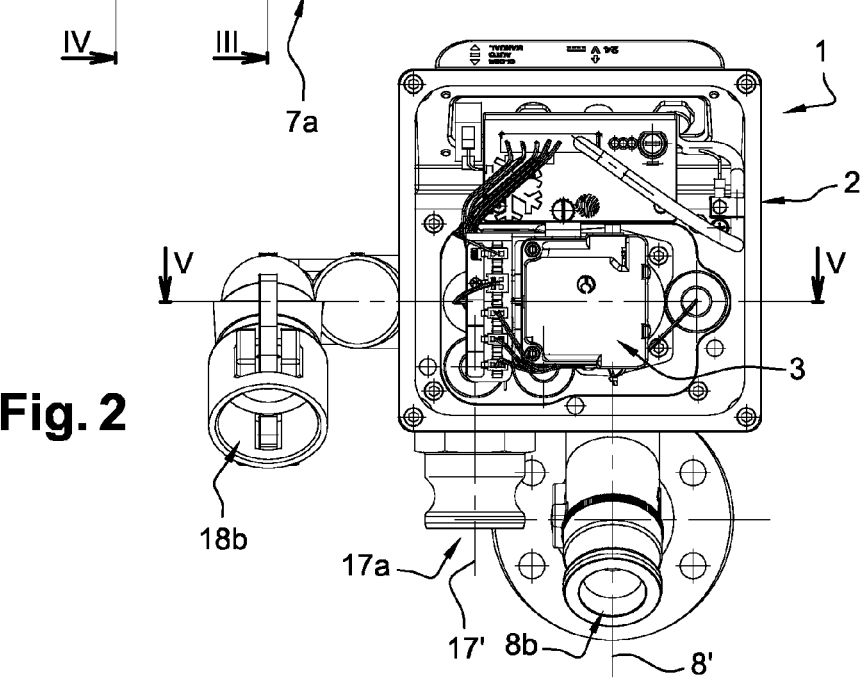
FIG. 2 is a view seen from above of the valve shown in FIG. 1.
Figure 3:
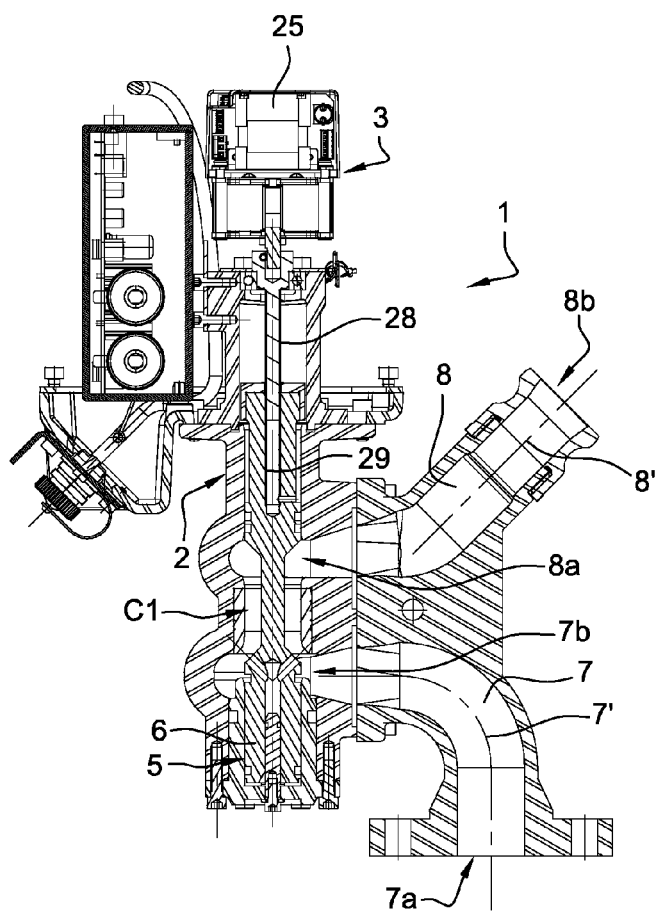
FIG. 3 is a section view of the valve of FIGS. 1 and 2, on a vertical section plane III-III of FIG. 1 containing the axis of the closure member of the water circuit (shown in the open position)
Figure 4:
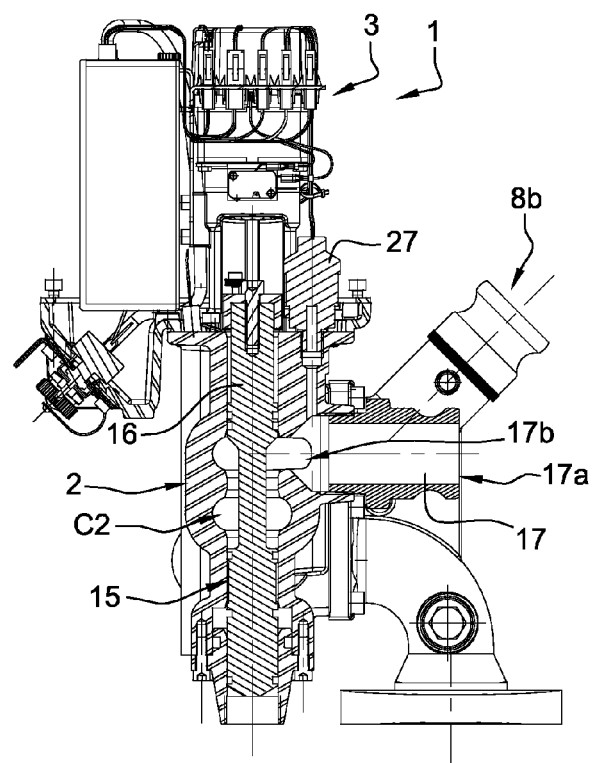
FIG. 4 is a section view of the valve of FIGS. 1 and 2, on a vertical section plane IV-IV of FIG. 1 containing the axis of the closure member of the air circuit (the closure member being shown in the open position)
Figure 5:
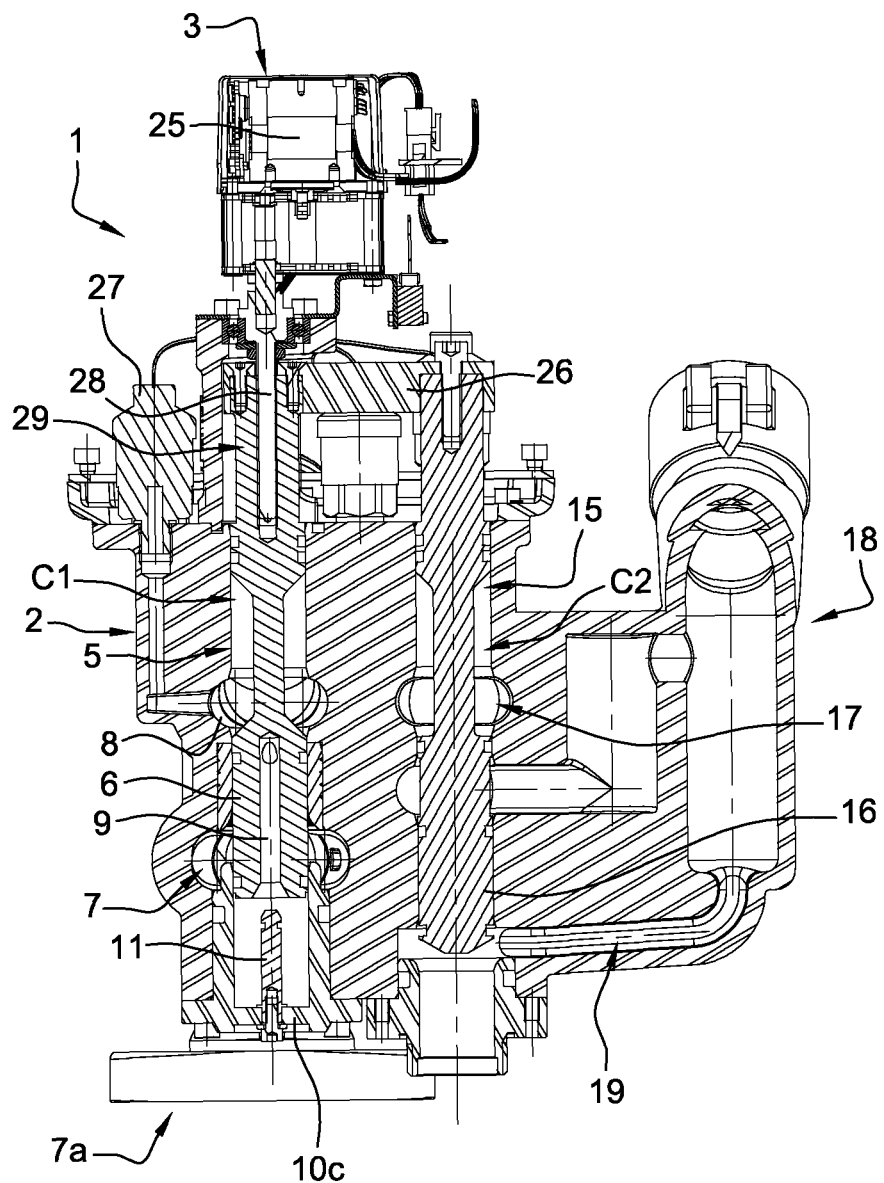
FIG. 5 is a section view of the valve of FIGS. 1 and 2, on a vertical section plane V-V of FIG. 2 containing the axes of the closure members of the water and air circuits (the closure members being shown in the closed position)

As shown, in particular in FIG. 5, it can be seen that, for this purpose, these control means 3 mainly include two elements:
a single motor-drive unit 25 for driving the closure members 6 and 16; and
a structure 26 for mechanically coupling together the two closure members 6 and 16.

The single motor-drive unit 25, e.g. constituted by an electric motor and gearbox unit, is flange-coupled to the top face of the valve body 2 and it is protected by a cover structure.

This motor-drive unit 25 may be a variable-speed unit having position control (e.g. a motor and gearbox unit of the brushless type); it is associated with suitable driver means that are suitably configured (in particular, controlling the speed and the position can make it possible to manage the time taken for each phase of the sequence described below).

For operation purposes, the valve 1 is also advantageously equipped with various pressure sensors 27 that may be air or water pressure sensors. In this example, these pressure sensors are in communication with the feed channels 7 and 17, and with the outlet channels 8 and 18 of the two circuits C1 and C2.

The valve body 2 is also provided with orifices that enable the power and/or control wires to pass through.

This valve 1 is also provided with end-of-stroke devices associated with various components that enable it to operate and that enable parameters related to such operation to be collected.

The driver means may be programmed such that the positions of the closure members 6 and 16 are servo-controlled to the value of a measured physical magnitude, e.g. the water and/or air flow-rate and/or pressure, or the presence of water (as detected by a suitable sensor, e.g. inside the chamber 20). The time for which one of the positions (described below) is held can thus be dependent on the value of at least one of said measured physical magnitudes.

In the present embodiment, the motor member 25 drives a screw 28 in rotation about its axis, which screw 28 co-operates with a threaded internal bore 29 provided axially inside the cylindrical top portion 6a of the closure member 6 which, in this example, equips the water circuit C1.

The structure of the mechanical coupling 26, between the two closure members 6 and 16, consists of a kind of plate, secured by any suitable means (e.g. by screw-fastening) to the top ends of the component cylindrical portions 6a and 16a of the closure members 6 and 16.

In this way, the stroke in translation applied to the closure member 6 of the water circuit C1 by the motor-drive unit 25 corresponds, in this example, exactly and continuously to the stroke of the closure member 16 equipping the air circuit C2. Thus, given the structures of the valve body 2 and of closure members 6 and 16, the air circuit is opened before the water circuit is opened.

In practice, and in accordance with the invention, the control means 3 cause the two closure members 6 and 16 to slide in their respective cylindrical chambers 5 and 15, each closure member sliding between:

an open position (FIGS. 3, 4, and 11), in which the inlet channels 7 and 17 are in communication with the associated channels 8 and 18, via the intermediate chamber zones 5c and 15c, and in which the emptying channels 9 and 19 are closed off; and a closed position (FIG. 5), in which the intermediate chamber zones 5c and 15c are closed off by the associated closure members 6 and 16, and in which the outlet channels 8 and 18 are in communication with the respective open emptying channels 9 and 19.

More precisely, in the closed position, as shown in FIG. 5, the closure members 6 and 16 of the two circuits C1 and C2 are in the high positions in their respective chambers 5 and 15.

In this closed position, the water circuit C1 and the air circuit C2 are closed:

the bottom cylindrical portion 6b of the closure member 6 of the water circuit C1 closes off the downstream orifice 7b of the inlet channel 7; and the bottom cylindrical portion 16b of the closure member 16 of the air circuit C2 closes off the upstream orifice 18a of its outlet channel 18.

Also in this closed position, the water of the installation downstream from the valve can flow merely by gravity through the emptying channel 9, which is open (the plug 11 being out of the emptying channel 9), and can drain away via the orifices provided in the end-wall 10c of the sleeve 10.

Similarly, the bottom end of the closure member 16 of the air circuit C2 is situated above the downstream orifice 19b of the channel 19, allowing any water present in the outlet channel 18 and in the installation downstream from the valve to drain away.

Starting from this closed position, in order to feed water and air to the installation downstream from the valve, the control means 3 drive the closure members 6 and 16 towards the bottom ends 5b and 15b of their respective chambers 5 and 15.

Before the water circuit C1 is opened, the particular structure of the valve 1 makes it possible to obtain various safety and start-up positions.

One of these positions makes it possible, in particular, for the air feed pipe to be actively bled, thereby, in particular, preventing any water present in this pipe from reaching the downstream spray device (the presence of water giving rise to a risk of freezing of certain portions of the spray device, in particular the nucleators). This action is optimized by the baffle shape of the outlet channel 18.

Figure 8:
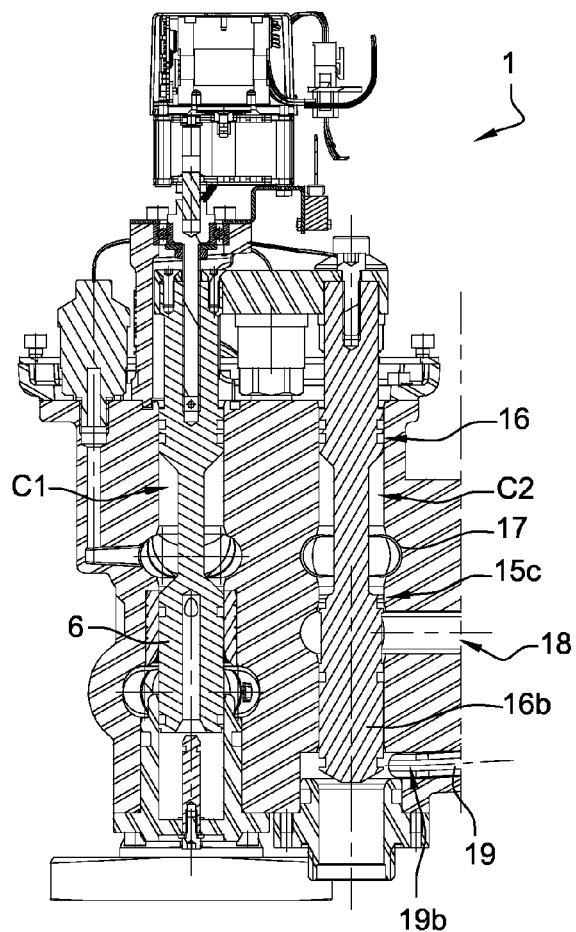
FIGS. 8 to 11 show how the corresponding moving parts are driven to cause the closure members of the air and water circuits to go from their closed position to their open position.
Figure 9:
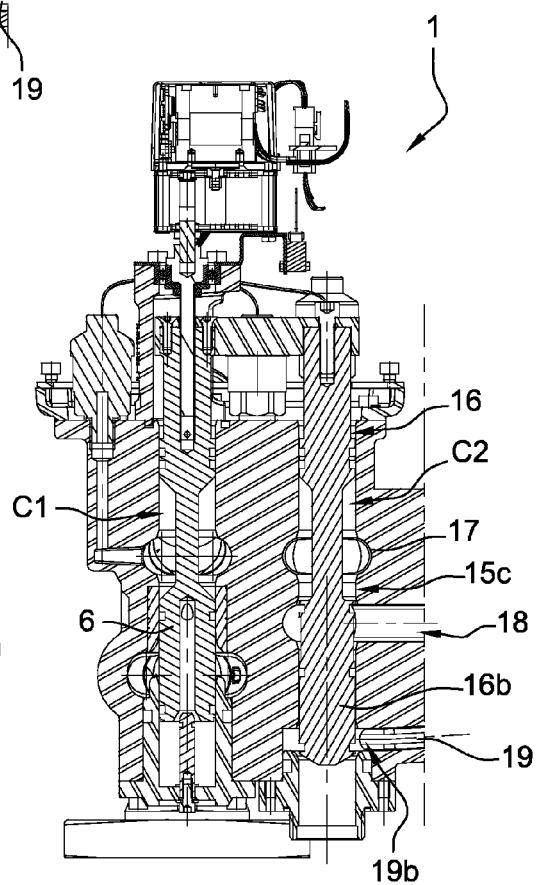

Thus, as shown in FIGS. 8 and 9, the structure of the valve 1 allows the closure members 6 and 16 to be driven into a first intermediate configuration in which:

the closure member 6 is still in a closure position in which the water circuit C1 is closed; and the closure member 16 of the air circuit C2 takes up an "intermediate" position, situated between the closed and the open positions.

In this intermediate position, the air circuit C2 has the following configuration:

firstly the inlet channel 17 comes into communication with the outlet channel 18 via the intermediate chamber zone 15c, which is at least partially opened up by the bottom portion 16b of the closure member 16 (the upstream orifice 18a of the outlet channel 18 is partially open); and secondly, the downstream orifice 19b of the channel 19 remains in an open position (it is not closed off by the closure member 16).

The pressurized air, coming from the inlet channel 17, then flows both towards the downstream orifice 18b of the outlet channel 18 and through the channel 19; and the air pipe downstream from the valve is bled.

Any water present in the air is removed actively via the channel 19 (hence this channel is referred to as the "bleed/emptying" channel). It is thus possible to avoid problems of the downstream spray devices being clogged with water in solid form.

Figure 10:
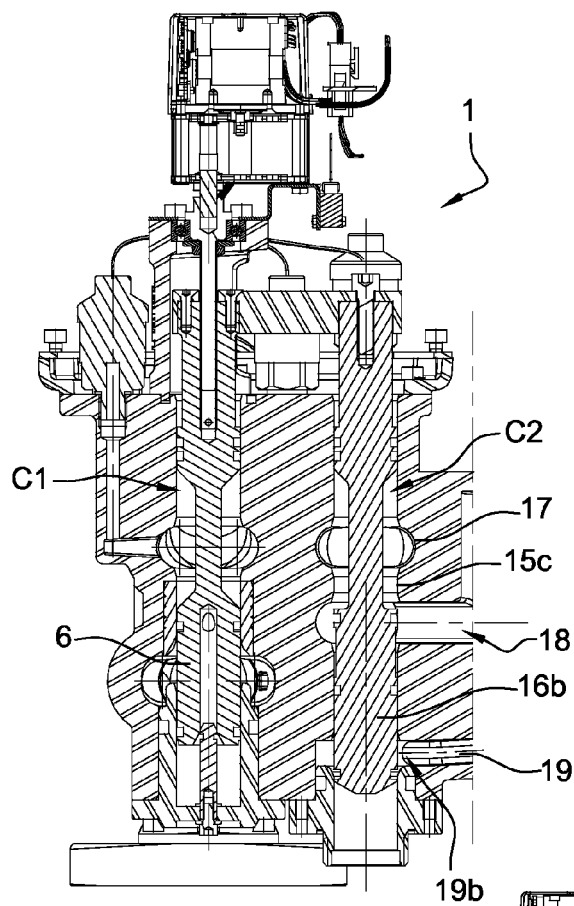

The closure members 6 and 16 continuing to be driven towards their respective open positions leads to a second intermediate configuration, as shown in FIG. 10, and in which:

the closure member 16 of the air circuit C2 is still in its open position (with communication between the inlet channel 17 and the outlet channel 18 via the intermediate zone 15c of the chamber 15), but with a bleed/emptying channel 19 (and in particular its downstream end 19b) now closed off by the bottom cylindrical portion 16b of the closure member 16; and the closure member 6 maintains the water circuit C1 in its closed position.

Thus, the air circuit of the snow-maker is pressurized before the water arrives, thereby avoiding any water return via any mixing chambers.

Figure 11:
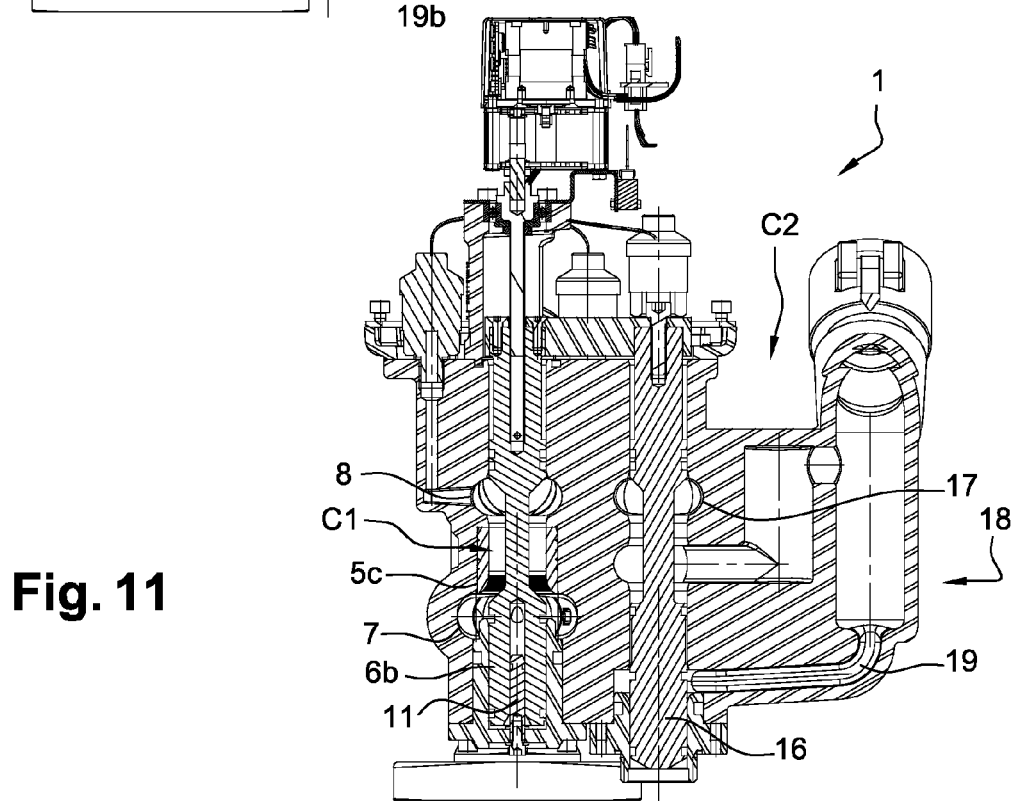

Then, as shown in FIG. 11, the closure member 6 of the water circuit C1 also reaches its open position in which its bottom cylindrical portion 6b opens up the downstream orifice 7b of the feed channel 7.

In this position, and at the water circuit C1, the inlet channel 7 is in communication with the outlet channel 8 via the intermediate chamber zone 5c, and the emptying channel 9 is closed off by the plug 11.

When the feed to the spray devices needs to be interrupted, the closure members 6 and 16 are driven in the opposite direction, so as to cause them to return to the closed positions as shown in FIG. 5.

During this return to the closed position, the water circuit C1 closes before the air circuit C2, thereby enabling cleaning to take place and enabling any water situated in the downstream spray device to be bled off.

In the closed final position, after operation, the two circuits C1 and C2 are automatically emptied, the water draining away by gravity through the respective channels 9 and 19 in the open position.

In a variant embodiment (not shown) the water circuit C1 is equipped with an outlet channel identical or similar to the outlet channel equipping the air circuit C2.

An intermediate position of the closure member of the water circuit then makes it possible to bleed the upstream circuit, in particular for removing any air contained in the water, e.g. while the water pipe is being filled.

This intermediate position for bleeding the water circuit is advantageously reached before the air circuit bleed position, in particular so as to enable action to be taken on the upstream water circuit without consuming air.

These water and air bleed operations are followed by opening the air circuit and then by opening the water circuit (as described above).

Thus, the valve makes it possible to remove air contained in the water pipes and that might disturb the pressure regulation.

Such a valve makes it possible to limit the use of members dedicated to this air removal function; it is then necessary to provide appropriate control of the motor drive and of the sequences implemented.

In general, these bleed means on the water circuit may be provided independently of the presence of bleed means on the air circuit.

In addition, the bleed means on the air circuit and the bleed means on the water circuit may be provided independently of the channels for performing emptying (by means of dedicated orifices or channels provided in the valve body, co-operating appropriately with the associated closure member 6 and/or 16).

The invention claimed is:

1. A valve for dispensing water and air, in installations for spraying water under pressure to make artificial snow, comprising:
    a body provided with two independent circuits, each of which enables the respective water and air to flow through the body;
    a chamber in each circuit in which a closure member in the form of a slide is received;
    a water or air inlet channel in each circuit that enables the air and water to enter said body via an upstream orifice, and that is connected to said chamber via a downstream orifice;
    a fluid outlet channel in each circuit that enables the fluid to exit, that is connected to said chamber via an upstream orifice, and that opens out from said body via a downstream orifice;
    a channel in each circuit in communication with said outlet channel or suitable for coming into communication therewith, provided with an upstream orifice and opening out via a downstream orifice, in order to enable the water or air contained in said outlet channel to be emptied;
    a control device for said closure members as disposed and guided in their respective chambers, so as to cause each closure member to go between:
        an open position, in which said inlet channel is in communication with said outlet channel via a through zone of said chamber, and in which said emptying channel is closed off; and
        a closed position, in which said through zone is closed off by said associated closure member, and in which the emptying channel is open;
    and said control device is formed from a single motor-drive unit for driving said closure members and a structure for mechanically coupling together the two closure members so as to ensure that said two closure members are driven simultaneously within their respective chambers.

2. The valve according to claim 1, wherein the motor drive unit co-operates with one of the closure members, and the coupling structure mechanically interconnects the top ends of the two closure members so as to ensure that the closure members are driven simultaneously.

3. The valve according to claim 1, wherein the valve is structured so that the closure members are configured for being driven into a configuration in which the closure member of the air circuit is situated in the open position while the closure member of the water circuit is in the closed position.

4. The valve according to claim 1, wherein the valve is structured so that driving the closure members into the open position makes possible flow rate regulation and to control the pressure of at least one of the fluids.

5. The valve according to claim 1, wherein the valve includes a channel in the air circuit and/or a channel in the water circuit, which channel is suitable for co-operating with the closure member of the corresponding circuit to bleed water from the air or to bleed air from the water, as applicable, from the upstream pipes, before opening said air and/or water circuits.

6. The valve according to claim 1, wherein the emptying channel for the air circuit is provided in the valve body, outside a volume of the associated chamber so that the upstream orifice opens out into the outlet channel of said air circuit, and so that the downstream orifice opens out at a bottom end of said chamber, and the closure member of said air circuit is drivable by the control device into an intermediate position, situated between the closed position and the open position, in which intermediate position said inlet channel is in communication with the outlet channel via the through zone of the associated chamber and the emptying channel is open, so as to make possible, in particular, for the air circuit to be subjected to an active bleed operation on opening said air circuit.

7. The valve according to claim 1, wherein the outlet channel of the air circuit has a baffle-forming portion, including a chamber in two portions, including an upstream portion and a downstream portion, separated by a transverse partition provided with a through orifice offset upwards relative to an inlet orifice of said upstream portion, which downstream portion of the chamber is extended at the top via a downstream orifice of the air circuit and, at a bottom, is provided with the upstream orifice of the bleed/emptying channel.

8. The valve according to claim 1, wherein the emptying channel of the water circuit is provided in the closure member of said water circuit, at a bottom end, which emptying channel comprises a downstream orifice opening out facing the bottom end of the associated chamber, and an upstream orifice opening out into the fluid through zone of said chamber, which emptying channel is opened or closed, depending on the position of said closure member, by means of a plug provided at the bottom end of said chamber.

9. The valve according to claim 1, wherein for the water circuit, the downstream orifice of the inlet channel is situated below the upstream orifice of the outlet channel, and for the air circuit, the downstream orifice of the inlet channel is situated above the upstream orifice of the outlet channel.

10. A method of operating at least one valve for dispensing water and air, in installations for spraying water under pressure for making artificial snow, which valve or each of which valves constitutes two circuits, one for air and the other for water, and comprises:
- a body provided with two independent circuits, each of which enables respective water or air water to flow through the body;
- a chamber in each circuit in which a closure member in the form of a slide is received;
- a water or air inlet channel in each circuit that enables the water and air to enter said body via an upstream orifice, and that is connected to said chamber via a downstream orifice;
- a fluid outlet channel in each circuit that enables the fluid to exit, that is connected to said chamber via an upstream orifice, and that opens out from said body via a downstream orifice;
- a channel in each circuit in communication with said outlet channel or suitable for coming into communication therewith, provided with an upstream orifice and opening out via a downstream orifice, in order to enable the water and air contained in said outlet channel to be emptied;
- a control device for said closure members as disposed and guided in their respective chambers, so as to cause each closure member to go between:
  - an open position, in which said inlet channel is in communication with said outlet channel via a through zone of said chamber, and in which said emptying channel is closed off; and
  - a closed position, in which said through zone is closed off by said associated closure member, and in which the emptying channel is open;
- said closure members of the air circuit and/or of the water circuit also being drivable into an intermediate position, situated between the closed position and the open position, in which intermediate position said inlet channel is in communication with the outlet channel via said through zone of said associated chamber and the emptying channel is open;

which method includes implementing the following steps in succession, starting from the closed position for the two fluid circuits:
a) moving at least one of said closure members into the intermediate position so as to bleed the corresponding circuit;
b) moving the closure member of the air circuit only into the open position so as feed said circuit with air; and then
c) moving the closure member of the water circuit into the open position so as feed said circuit with water;
which steps are implemented in reverse order for returning said two closure members to the closed position when water and air cease to be supplied.

11. The method according to claim 10, wherein the closure members of the air circuit and of the water circuit are drivable into an intermediate position so as to bleed the two circuits, and in that said intermediate position of the closure member of the water circuit is reached before the intermediate position of the closure member of the air circuit.

12. The method according to claim 10, wherein the valve is structured so that the position of the closure members makes it possible to regulate the fluid flow rate and to control the fluid pressure, and the position of the closure members in the open configuration, and the time for which said position is maintained, are dependent on the measured value for pressure and/or for flow rate of the water and air, or on information delivered by a water presence sensor in the outlet channel.

13. The method according to claim 11, wherein the valve is structured so that the position of the closure members makes it possible to regulate the fluid flow rate and to control the fluid pressure, and the position of the closure members in the open configuration, and the time for which said position is maintained, are dependent on the measured value for pressure and/or for flow rate of the water and air, or on information delivered by a water presence sensor in the outlet channel.

14. The valve according to claim 2, wherein the valve is structured so that the closure members are suitable for being driven into a configuration in which the closure member of the air circuit is situated in the open position while the closure member of the water circuit is in the closed position.

15. The valve according to claim 2, wherein the valve is structured so that driving the closure members into the open position makes it possible to regulate the flow rate and to control the pressure of at least one of the fluids.

16. The valve according to claim 2, wherein the valve includes a channel in the air circuit and/or a channel in the water circuit, which channel is suitable for co-operating with the closure member of the corresponding circuit to bleed water from the air or to bleed air from the water, as applicable, from the upstream pipes, before opening said air and/or water circuits.

17. The valve according to claim 2, wherein the emptying channel for the air circuit is provided in the valve body, outside the volume of the associated chamber so that the upstream orifice opens out into the outlet channel of said air circuit, and so that the downstream orifice opens out at a bottom end of said chamber, and the closure member of said air circuit is drivable by the control device into an intermediate position, situated between the closed position and the open position, in which intermediate position said inlet channel is in communication with the outlet channel via the through zone of the associated chamber and the emptying channel is open, so as to make possible for the air circuit to be subjected to an active bleed operation on opening said air circuit.

18. The valve according to claim 2, wherein the outlet channel of the air circuit has a baffle-forming portion, including a chamber in two portions, namely an upstream portion and a downstream portion, separated by a transverse partition provided with a through orifice offset upwards relative to the inlet orifice of said upstream portion, which downstream portion of the chamber is extended at the top via a downstream orifice of the air circuit and, at a bottom, is provided with the upstream orifice of the bleed/emptying channel.

19. The valve according to claim 2, wherein the emptying channel of the water circuit is provided in the closure member of said water circuit, at its bottom end, which emptying channel comprises a downstream orifice opening out facing the bottom end of the associated chamber, and an upstream orifice opening out into the fluid through zone of said chamber, which emptying channel is opened or closed, depending on the position of said closure member, by means of a plug provided at a bottom end of said chamber.

20. The valve according to claim 2, wherein for the water circuit, the downstream orifice of the inlet channel is situated below the upstream orifice of the outlet channel, and for the air circuit, the downstream orifice of the inlet channel is situated above the upstream orifice of the outlet channel.

\* \* \* \* \*